(12) United States Patent
Wehrenberg

(10) Patent No.: US 8,132,197 B2
(45) Date of Patent: Mar. 6, 2012

(54) MOUNTING OBJECTS ON A TURNTABLE

(75) Inventor: Paul J. Wehrenberg, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 12/841,910

(22) Filed: Jul. 22, 2010

(65) Prior Publication Data

US 2011/0258643 A1      Oct. 20, 2011

Related U.S. Application Data

(60) Provisional application No. 61/325,301, filed on Apr. 17, 2010.

(51) Int. Cl.
*G11B 17/04* (2006.01)

(52) U.S. Cl. ........................................ 720/710

(58) Field of Classification Search .............. 720/710, 720/717, 714, 713, 695, 728, 707, 706, 712, 720/622, 724, 723, 604; 369/264, 282
See application file for complete search history.

(56) References Cited

U.S. PATENT DOCUMENTS

| | | | |
|---|---|---|---|
| 5,805,552 A * | 9/1998 | Tozune et al. | 720/610 |
| 6,680,896 B2 | 1/2004 | Shiwa | |
| 2009/0077574 A1 | 3/2009 | Sonoda | |
| 2009/0241140 A1 | 9/2009 | Takaki et al. | |

* cited by examiner

*Primary Examiner* — Allen Cao
(74) *Attorney, Agent, or Firm* — Womble Carlyle Sandridge & Rice LLP

(57) ABSTRACT

The embodiments herein describe an apparatus and method for a reduced Z stack slot loading optical disc drive (ODD). In one embodiment, an optical disc mounting assembly can be used to chuck an optical disc to a turntable. The optical disc mounting assembly can include a hub spring for spring loading a hub and a clamping mechanism pivotally connected to the hub. In the described embodiment, in an extended position, the clamp is used to secure the optical disc to the turntable. The clamping mechanism can include a clamp pivotally attached to the hub at a pivot point. In the absence of the optical disc, the clamp is retracted and secured within a recess in the optical disc mounting assembly. In the presence of the optical disc, the mounting assembly chucks the optical disc to the turntable using the clamp and hub.

24 Claims, 7 Drawing Sheets

US 8,132,197 B2

MOUNTING OBJECTS ON A TURNTABLE

CROSS REFERENCE TO RELATED APPLICATONS

This application claims priority under 35 USC 119(e) to U.S. Provisional Patent Application No. 61/325,301, filed Apr. 17, 2010 and is incorporated herein by reference in its entirety for all purposes.

TECHNICAL FIELD

The described embodiments relate generally to computing systems and more particularly to an optical disc drive (ODD).

BACKGROUND OF THE INVENTION

In many cases it is necessary to mount objects onto a turntable. For example, many electronic devices contain an optical disc drive (ODD) for the purpose of reading and writing optical discs. Especially in the design of portable computers and electronic devices, there is a high value placed on reduction of size and weight. Conventional optical disc drives rely upon a coaxial hub/turntable/rotation motor combination that moves substantially along the axis of rotation (the 'z' direction) in one direction to allow the optical disc to be inserted and placed on the turntable. In order to secure the optical disc, the coaxial hub/turntable/rotation motor combination must then move in the other direction. This up and down movement in the z direction can substantially add to the overall height (also referred to as the Z stack) of the ODD limiting the potential to reduce the size and/or weight of the ODD and ultimately the electronic device in which the ODD is used.

Therefore, what is desired is a reduced Z stack optical disc drive.

SUMMARY OF THE DESCRIBED EMBODIMENTS

A reduced Z stack height slot loading optical disc drive (ODD) includes at least a slot arranged to receive an optical disc, a turntable having a central opening and a platen arranged to provide a surface upon which the optical disc is secured, and a reduced Z drive mounting assembly used for securing an optical disc to the turntable. The reduced Z drive mounting assembly including a hub assembly having at least a ferritic hub aligned with the turntable central opening and shaped to accommodate an optical disc central hole, an interior surface shaped to act as a cam, a hub spring arranged to generate a spring force used to extend the hub into the turntable central opening in the presence of the optical disc, at least one ferritic securing clamp pivotally attached to the mounting assembly at a pivot point, and an electromagnet arranged to create an induced magnetic field that attracts the ferritic hub and clamp, wherein the magnetic attraction overcomes the spring force and causes the hub and the at least one clamp to retract into the mounting assembly.

A method of securing an optical disc to the turntable of an optical disc drive can be performed by retracting a ferritic hub and at least one ferritic clamp into the mounting assembly using magnetic attractive forces generated by an induced magnetic field, centering an optical disc substantially over the turntable central opening, collapsing the induced magnetic field within the mounting assembly, and extending the ferritic hub and at least one ferritic clamp out of the mounting assembly through the turntable central opening such that at least one ferritic clamp makes contact with the optical disc and secures the optical disc to the turntable.

A method of mounting an optical disc to the turntable of an optical disc drive can be performed by receiving an inserted optical disc, detecting the presence of an inserted optical disc, generating a disc input signal in response to the presence of an inserted optical disc, generating a magnetic field within the mounting assembly in response to the disc input signal, causing a ferritic hub and at least one ferritic clamp to retract into the mounting assembly, positioning the optical disc such that the optical disc is substantially centered about the turntable central opening, detecting the presence of the optical disc upon being substantially centered around the turntable central opening, generating a disc centered signal in response to the optical disc being substantially centered around the turntable central opening, collapsing the magnetic field in response to the disc centered signal, thereby eliminating the induced magnetic forces applied to the hub and at least one ferritic clamp, and generating an extending force that causes the hub and at least one of the clamps to extend out of the mounting assembly such that the clamp makes contact with the optical disc thereby mounting the optical disc to the turntable.

A non-transitory computer readable medium for storing a computer program, the computer program executed by a processor for controlling the operation of an optical disc drive. The computer program including at least computer code for detecting the presence of an inserted optical disc, computer code for generating a disc input signal in response to the presence of an inserted optical disc, computer code for sending the disc input signal to the electromagnet within the mounting assembly, computer code for detecting the presence of the inserted optical disc being substantially centered about the turntable central opening, computer code for generating a disc centered signal in response to the presence of the disc being substantially centered about the turntable central opening, and computer code for sending the disc centered signal to the electromagnet within the mounting assembly.

BRIEF DESCRIPTION OF THE DRAWINGS

The invention and the advantages thereof may best be understood by reference to the following description taken in conjunction with the accompanying drawings.

DETAILED DESCRIPTION OF REPRESENTATIVE EMBODIMENTS

Figure 1:
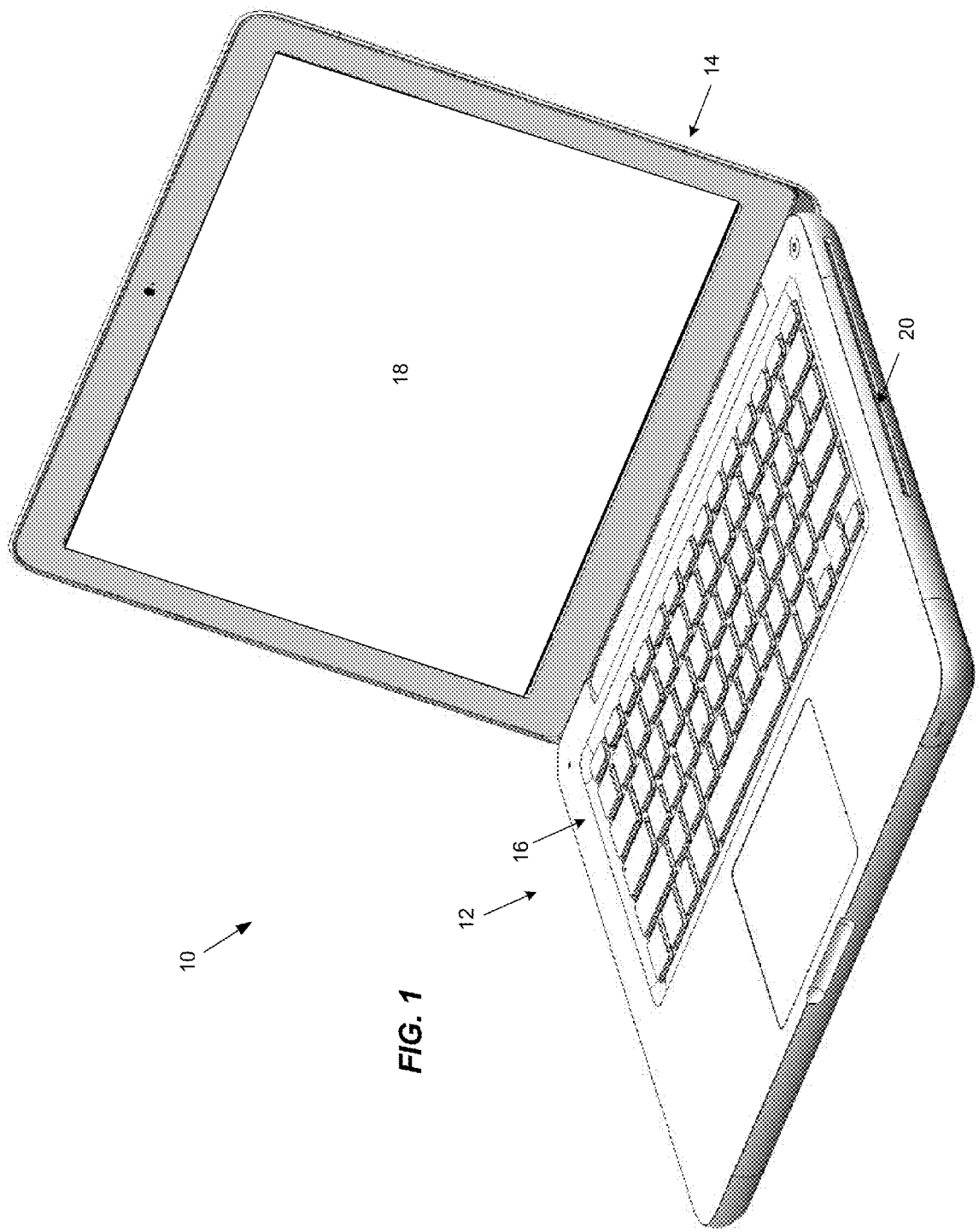
FIG. 1 shows representative computing system in accordance with the described embodiments.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The embodiments herein describe an apparatus and method for a reduced height, slot loading optical disc drive (ODD). The embodiments of the ODD described herein can include any number of configurations having at least an optical disc mounting assembly used to chuck (i.e., secure) an optical disc to a turntable. In one implementation, the optical disc mounting assembly can include a hub formed of at least some magnetic material along the lines of steel. The hub can be configured to move along an axis of rotation of the turntable as well as in a direction perpendicular to a plane of the turntable (referred to as the z direction). The optical disc mounting assembly can also include at least a clamp having a tip integrally formed with a base portion having a shaped surface in contact with a cooperatively shaped surface of the hub. The base portion of the clamp can be pivotally connected to a pivot structure that can be attached to the ODD at, for example, the turntable. In one embodiment, at least some of the clamp can be formed of ferritic material well suited for coupling with an externally applied magnetic field.

The optical disc mounting assembly can also include at least one spring or equivalent structure attached directly to the hub. The spring can generate a spring force that can be applied to the hub in a direction that can compel the hub to move outward from the turntable (in the context of this discussion, outward from the turntable can be considered in the +z direction). Since the base portion of the clamp is in cooperative contact with the corresponding surface of the hub, the motion of the hub in the +z direction causes the base portion of the clamp to rotate (i.e., pivot) about the pivot point. The rotation of the base portion, in turn, causes the claw portion and in particular the tip of the clamp to engage the optical disc in a grasping manner securing the optical disc to the turntable with a securing force concomitant with the spring force provided by the spring. In this way, only the tip of the claw portion extends above the optical disc thereby substantially reducing the effective height of the ODD to no more that the extent of the tip above a top surface of a mounted optical disk.

The optical disc mounting assembly can also include an electromagnet having at least N electromagnetic coils that can be energized to create a magnetic field. The direction and strength of the magnetic field created by the electromagnetic coil(s) can be influenced by the shape, size, and number of coils as well as the material used to form the electromagnetic coil(s). In this way, by forming at least some of the hub (and in some embodiments, at least some of the clamp) of ferritic material (along the lines of steel), the electromagnet can be used to retract the hub and clamp into the turntable (i.e., move in the −z direction) when the magnetic force is of sufficient strength to overcome the spring force generated by the spring. Moreover, the use of ferritic material to form at least part of the clamp can facilitate the coupling of the clamp with any magnetic field generated by the electromagnet. In this way, the movement of the clamp from the extended position to the retracted position in cooperation with the corresponding surface of the hub can be substantially enhanced. Furthermore, since the electromagnet is not consuming power when the hub/clamp combination is extended and the optical disc is secured to the turntable, overall power consumption of the ODD can be reduced.

When an optical disc is inserted into the optical disc drive and the center hole is properly positioned relative to the mounting assembly, a sensor can provide a cut off signal causing power to the electromagnet to be eliminated (or at least reduced below a threshold level). In any case, any magnetic field generated by the electromagnet collapses eliminating any magnetic coupling between the electromagnet and the hub/clamp combination. In this way, the hub is free to move under the influence of the spring force applied by the spring to an extended configuration relative to the turntable. In response to the cam action of the hub on the clamp, the clamp body rotates about the pivot point causing the tip to securely engage the optical disc.

These and other embodiments are discussed below with reference to FIGS. 1-8. However, those skilled in the art will readily appreciate that the detailed description given herein with respect to these figures is for explanatory purposes only and should not be construed as limiting.

FIG. 1 shows representative computing system 10 in accordance with the described embodiments. Computing system 10 can take the form of a desktop computing system or a portable computing system along the lines of a laptop computer. Accordingly, FIG. 1 shows computing system 10 in the form of laptop computer 10 having housing 12 formed of upper portion 14 pivotally connected to base portion 16. Upper portion 14 can include display 18. When upper portion 14 is moved from a closed position to an open position as shown in FIG. 1, upper portion 14 is pivoted with respect to base portion 16 to permit display 18 to present visual content. Laptop computer 10 can include various internal components such as a processor used to process executable instructions stored on various memory devices. The memory devices can include those enclosed within housing 12 such as a main memory that can take the form of a hard disc drive (HDD) or semiconductor memory along the lines of FLASH memory. In addition to memory devices enclosed within housing 12, external memory devices can be used to augment the memory resources provided by the those memory devices enclosed within housing 12. Such external memory devices can include memory cards and optical discs such as compact discs (CD) and digital video disc (DVD). In the context of this discussion, focus will be on optical disc memory media and especially with regards to computer systems that utilize an optical disc drive (ODD) enclosed within housing 12. The ODD can be used to read/write data from/to an optical disc in any form. In order to facilitate the insertion/ejection of the OD from the ODD enclosed within housing 12, optical disc slot 20 can be formed in housing 12 having a size and shape to accommodate the optical disc. Accordingly, when the optical disc is inserted into slot 20, the ODD receives and captures the optical disc and as directed by the processor, reads (or writes) data from/to the optical disc. At the completion of the operation or when directed by a user, the ODD ejects the optical disc through slot 20.

The remaining discussion will focus on the optical disc drive. In particular, an optical disc drive having a reduced Z stack height is described. The reduced Z stack height ODD facilitating reducing the overall thickness of computer system 10.

Figure 2:
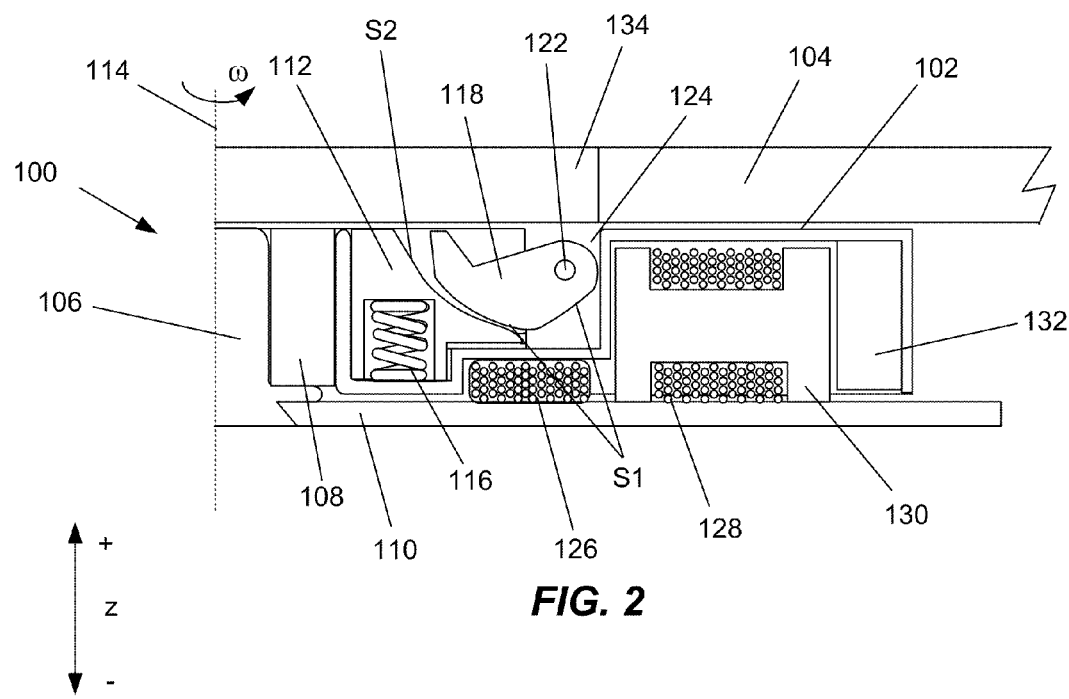
FIG. 2 show a cross sectional view of a portion of ODD assembly in a retracted configuration in accordance with the described embodiments.

FIG. 2 show a cross sectional view of a portion of ODD assembly 100 in a retracted configuration in accordance with the described embodiments. ODD assembly 100 can include at least turntable 102 on which can be placed an optical disk (OD) 104. Turntable 102 can rotate about shaft 106 and bushing (or bearing) 108 mounted on base 110. ODD assembly 100 also can include hub 112 at least partially composed of magnetic material that can rotate about axis of rotation 114 with angular velocity ω. Spring (or springs) 116 attached to hub 112 can exert spring force $F_{spring}$ directly on hub 112.

Claw (or clamp) 118 can include base portion 120 having surface S1 in co-operative contact with hub 112 along surface S2. Base portion 120 can include pivot pin 122 mounted to pivot structure 124 attached in one embodiment to turntable 102. ODD assembly 100 can also include electromagnet (EM) 126 having N coils attached to base 110. EM 126 can generate magnetic field H that can couple with the magnetic material in hub 112. Various rotational motor elements common in prior art are also shown. The various rotational motor elements can include at least rotation motor electromagnetic coils 128 and cores 130 attached to the base 110 and polarized magnetic material 132 attached to the rim of the turntable 102.

The magnetic coupling between hub 112 and EM 126 can result in attractive magneto-motive force being applied to hub 112. Magneto-motive force can be related to current $I_{EN}$ flowing through EM 126 according to equation (1):

$$\vec{u} = N \times I_{EM} \quad \text{Eq (1)}$$

where (as noted above) N is the number of coils in EM 126 and current $I_{EM}$ is an amount of current that is induced to flow through EM 126. In this way, spring force $F_{spring}$ applied to hub 112 by spring 116 can be counterbalanced by inducing current $I_{EM}$ through EM 126 having a value that is at least equal to $I_{thresh}$ according to Eq. (2):

$$F_{spring} = N \times I_{thresh} \quad \text{Eq (2)}$$

In this way, inducing current $I_{EM}$ that is greater than $I_{thresh}$ in EM 126 can result in magneto-motive force sufficient to move hub 112 into the retracted configuration of FIG. 2. In some implementations, at least a portion of clamp 118 can also be formed of material capable of magnetically coupling with the magnetic field H generated by EM 126. In this way, when appropriately energized, EM 126 can act to clear center hole 134 by compelling hub 112 to move in the −z direction. Due to the coupling of magnetic field H and clamp 118, clamp 118 can also be drawn towards EM 126 resulting in surface S1 moving in cooperation with surface S2 of hub 112 as clamp 118 rotates about pivot pin 122. In this way, a "clear path" can be provided that permits OD 104 to be inserted into ODD assembly 100 and onto turntable 102 during an OD insertion event. On the other hand, sufficiently energizing EM 126 to move hub 112 and clamp 118 from opening 134 can also clear a path for the ejection of OD 104 during an ejection event. Since EM 126 is energized only for that period of time required to insert or eject OD 104 power consumption can be commensurably reduced.

De-energizing (by removing $I_{EM}$ or at least reducing $I_{EM}$ below $I_{thresh}$) EM 126 can result in the collapse of magnetic field H thereby de-coupling EM 126 and hub 112 and/or clamp 118. In this way, hub 112 can be compelled to move by spring force $F_{spring}$ in the +z direction from the retracted position of FIG. 2 to the extended position of FIG. 3. It should be noted that as hub 112 moves, clamp tip 136 can enter center hole 134 causing disc 104 to center within hole 134. Moreover, the cam action provided by the surface S2 of hub 112 which presses on surface S1 of clamp 118 can cause the clamp 118 to pivot about pivot 122. In this way, tips 136 of clamp 118 clamp OD 104 to turntable 102. It should be noted that tips 136 extend no more than distance "d" above OD 104 thereby limiting the effective Z stack height of ODD 100.

Figure 4:
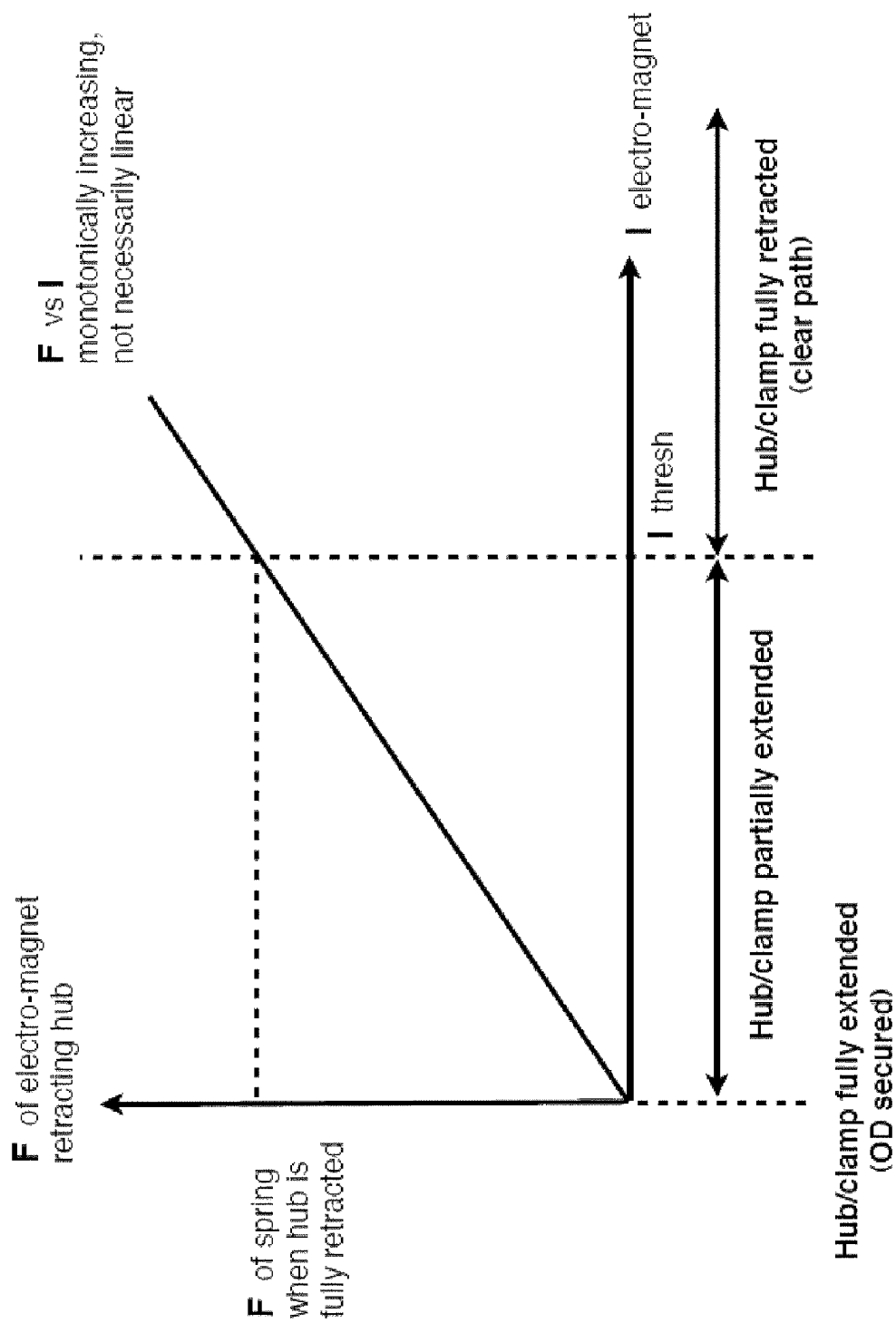
FIG. 4 is a graphical representation showing the relationship between current $I_{EM}$ in an electromagnet and magnetomotive force $\mathfrak{z}$.

FIG. 4 is a graphical representation showing the relationship between current $I_{EM}$ in EM 126 and magneto-motive force $\vec{u}$. When $I_{EM}$ is at least equal to $I_{thresh}$, magneto-motive force equals spring force $F_{spring}$ effectively allowing hub 112 and clamp 118 to retract. It should be noted that the net force ($F_{net}$) applied to hub 112 and claim 118 is the difference between spring force $F_{spring}$ and magneto-motive force ($I_{thresh}$). Therefore, release time $T_{release}$ being an amount of time required for hub 112 and clamp 118 to retract can be controlled by varying current $I_{EM}$. For example, increasing $I_{EM}$ can result in a reduction of $T_{release}$.

Figure 3:
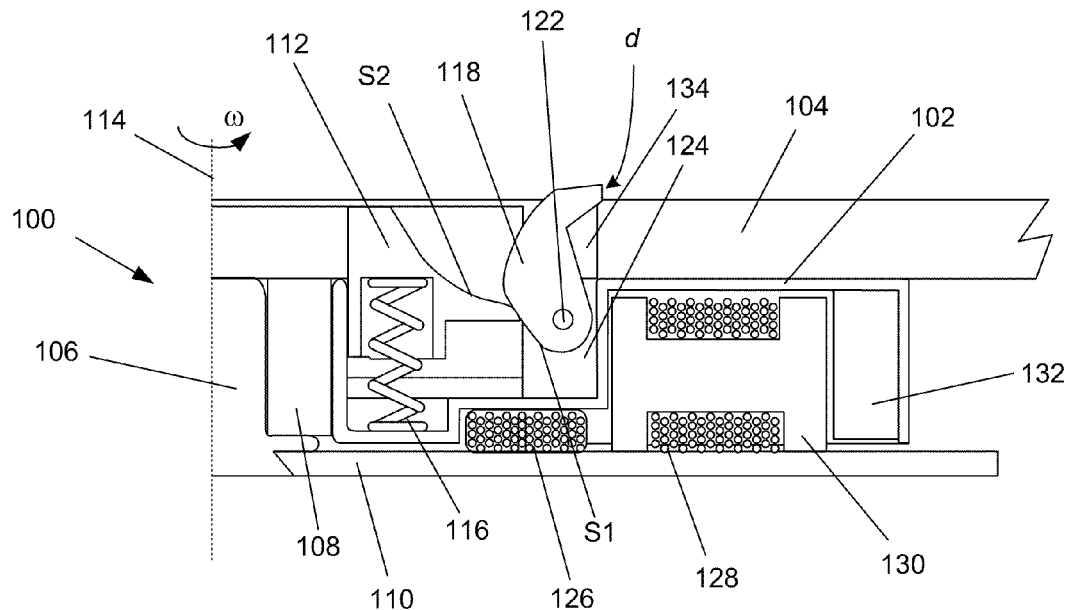
FIG. 3 shows the ODD assembly of FIG. 2 in an extended configuration.
Figure 5:
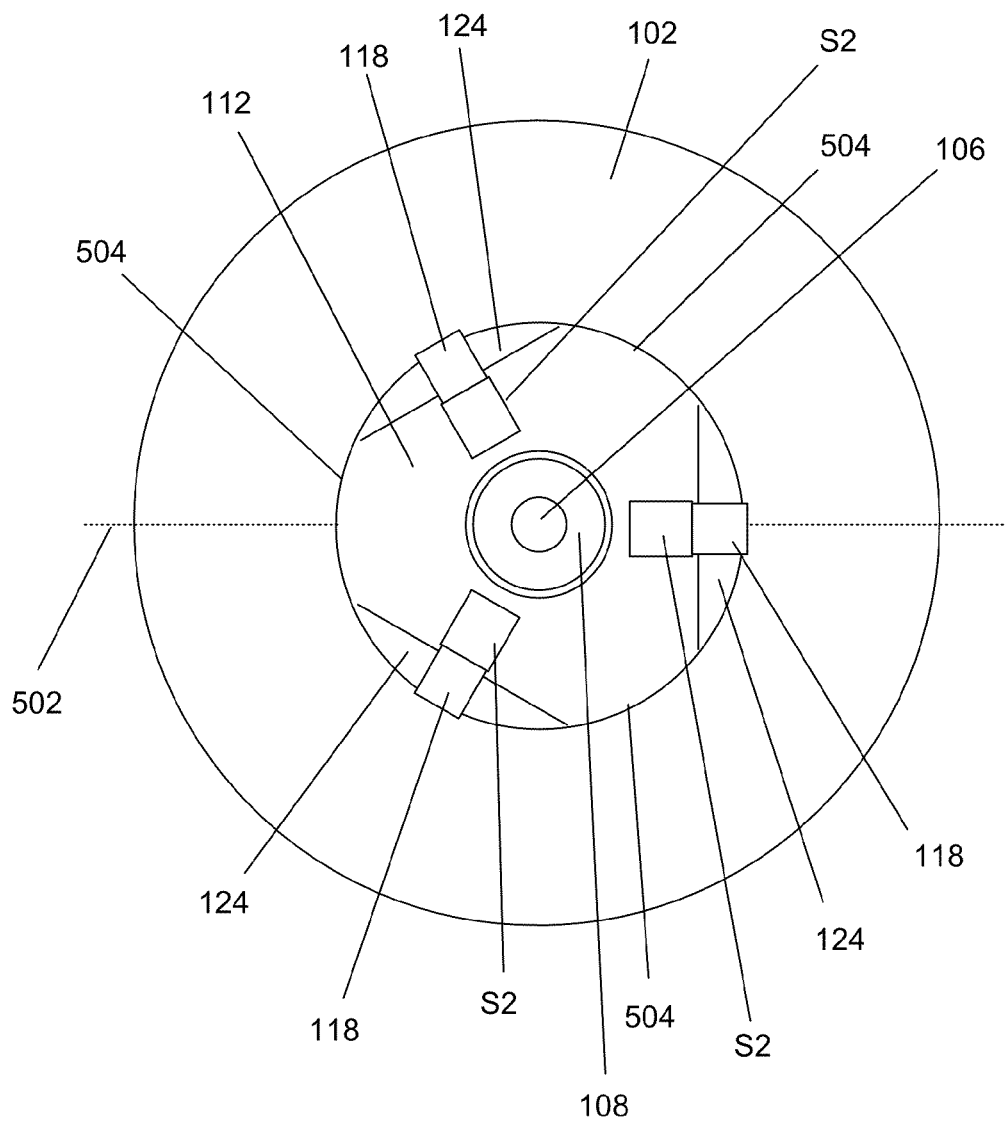
FIG. 5 shows a top view of the optical disc drive corresponding to the cross sections of optical disc drive shown in FIGS. 2 and 3.

FIG. 5 shows a top view of ODD 100 where dashed line 202 corresponds to the cross sections of ODD 100 shown in FIGS. 2 and 3. As viewed from the top, retractable hub 112 is shown to include at least three clamps 118. It should be noted, however, that any number of clamps 118 can be used without loss of generality. A portion of the circumference 204 of hub 112 can be used for centering OD 104 on the turntable whereas another portion of the circumference of hub 112 can be configured to accommodate clamp 118 as well as pivot structure 124. It should be noted that although center hole 136 is shown as being circular, any shape hole can be accommodated without loss of generality.

Figure 6:
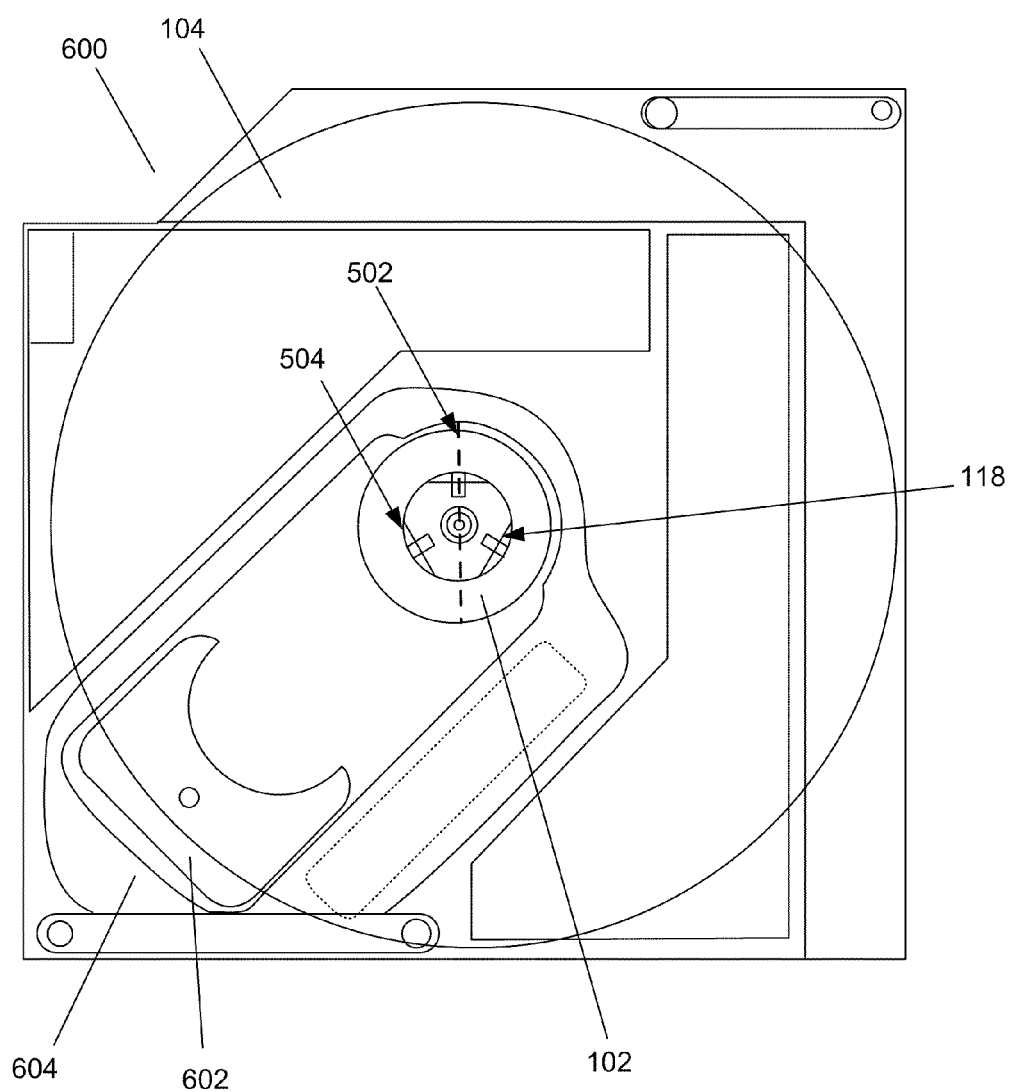
FIG. 6 shows another embodiment of ODD assembly in a plan view of a slot loading ODD.

FIG. 6 shows another embodiment of ODD assembly 100 in a plan view of a slot loading ODD 600. Also shown for context is OD 104 mounted to turntable 102, optical pickup unit 602 for reading OD 104, frame 604 that supports optical pickup unit 602 as well as ODD assembly 100.

Figure 7:
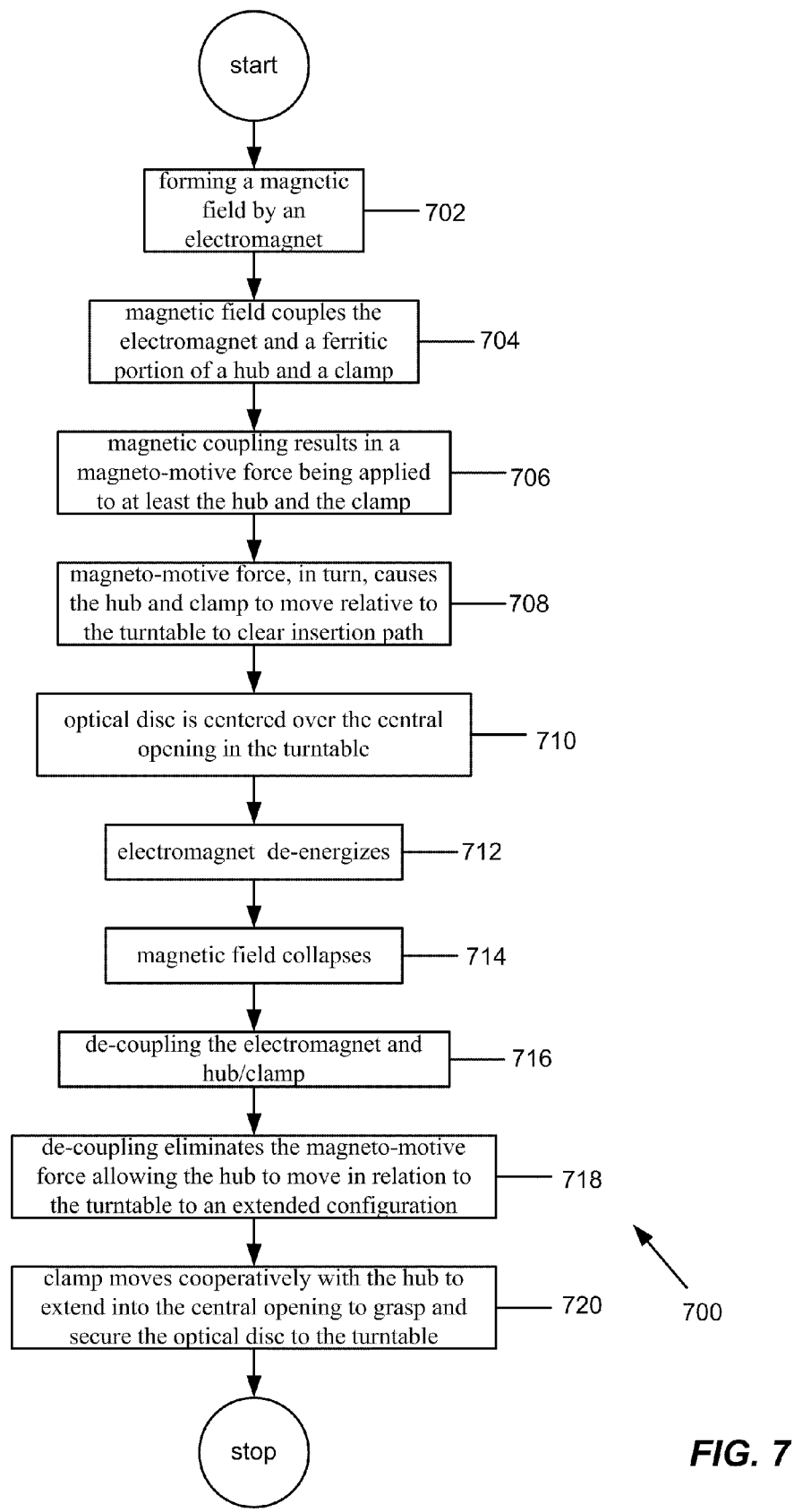
FIG. 7 is a flowchart detailing process for securing an optical disc to a turntable in accordance with the described embodiments.

FIG. 7 is a flowchart detailing process 700 for securing an optical disc to a turntable in accordance with the described embodiments. Process 700 can be carried out by performing at least the following operations. At 702, a path is cleared for insertion of the optical disk initially by forming a magnetic field by an electromagnet. At 704, the magnetic field couples the electromagnet and a ferritic portion of a hub and a clamp. The magnetic coupling results in a magneto-motive force being applied to at least the hub and the clamp at 706. The magneto-motive force, in turn, causes the hub and clamp to move relative to the turntable at 708 so as to remove any portion of the clamp from a central opening of the turntable thereby clearing an insertion path for the optical disc. Next, at 710, once the insertion path is cleared, the optical disc is centered over the central opening in the turntable causing the electromagnet to de-energize at 712 resulting in the magnetic field collapsing at 714 thereby de-coupling the electromagnet and hub/clamp at 716. The de-coupling eliminates the magneto-motive force allowing the hub to move in relation to the turntable to an extended configuration at 718. The clamp moves cooperatively with the hub to extend into the central opening to grasp and secure the optical disc to the turntable at 720.

Figure 8:
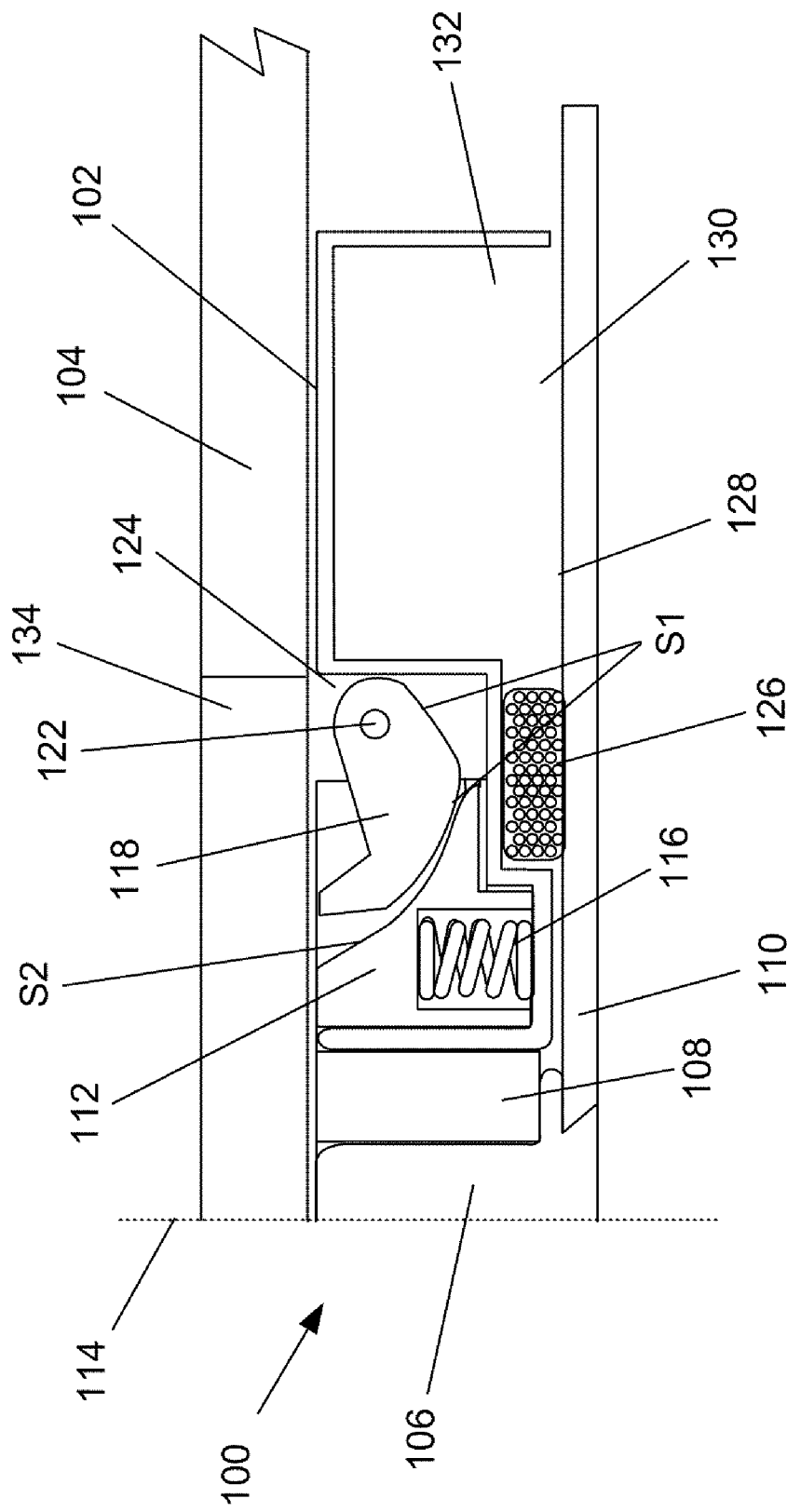
FIG. 8 shows an alternate embodiment.

FIG. 8 shows an implementation of the optical disc drive in the form of ODD 800 where the conventional rotational components (including rotation motor electromagnetic coils 128 and cores 130 attached to the base 110 and polarized magnetic material 132) are not included in the retractable hub/retractable claws/turntable combination of FIGS. 2 and 3. In the configuration of ODD 800 the motive force for rotation is applied externally to the turntable 102. For example, the motive force for rotation can be applied to the rim surface 802 of turntable 102.

Various aspects of the described embodiments can be implemented by software, hardware or a combination of hardware and software. The described embodiments can also be embodied as computer readable code on a computer readable medium for controlling manufacturing operations or as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over networkcoupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A reduced Z stack height slot loading optical disc drive (ODD), comprising:
    a slot arranged to receive an optical disc;
    a turntable having a central opening and a platen arranged to provide a surface upon which the optical disc is secured; and
    a reduced Z drive mounting assembly used for chucking an optical disc to the turntable, the reduced Z drive mounting assembly comprising:
    a hub assembly, the hub assembly comprising:
        a ferritic hub aligned with the turntable central opening and shaped to accommodate an optical disc central hole,
        an interior surface shaped to act as a cam,
        a hub spring arranged to generate a spring force used to extend the hub into the turntable central opening in the presence of the optical disc,
        at least one ferritic securing clamp pivotally attached to the mounting assembly at a pivot point, and
        an electromagnet arranged to create an induced magnetic field that attracts the ferritic hub and clamp, wherein the magnetic attraction overcomes the spring force and causes the hub and the at least one clamp to retract into the mounting assembly.

2. The optical disc drive as recited in claim 1, wherein when the electromagnet is de-energized, the force generated by the hub spring causes a portion of the ferritic hub and at least one ferritic securing clamp to extend out of the mounting assembly.

3. The optical disc drive as recited in claim 1, wherein the electromagnet is positioned at the base of the mounting assembly substantially underneath the ferritic hub and at least one ferritic securing clamp.

4. The optical disc drive as recited in claim 1, wherein the ferritic securing clamp contacts the interior surface of the ferritic hub, creating a cam movement action that causes the clamp to pivot in response to displacement of the hub.

5. The optical disc drive as recited in claim 1, further comprising a disc input sensor that sends an on signal to the electromagnet causing the electromagnet to energize and create an induced magnetic field.

6. The optical disc drive as recited in claim 1, further comprising a turntable center sensor that sends an off signal to the electromagnet causing the electromagnet to de-energize and collapse the induced magnetic field when an optical disc is substantially centered over the turntable center opening.

7. The optical disc drive as recited in claim 1, further comprising rotation motor elements to drive the turntable to rotate about an axis of rotation during device operation.

8. The optical disc drive as recited in claim 7, wherein the rotation motor elements are positioned within the turntable.

9. The optical disc drive as recited in claim 7, wherein the rotation motor elements are positioned outside of the turntable.

10. The optical disc drive as recited in claim 9, wherein the rotation motor elements are coupled to the outer surface of the turntable to drive the rotation of the turntable.

11. A method of securing an optical disc to the turntable of an optical disc drives comprising the steps of:
    retracting a ferritic hub and at least one ferritic clamp into the mounting assembly using magnetic attractive forces generated by an induced magnetic field;
    centering an optical disc substantially over the turntable central opening;
    collapsing the induced magnetic field within the mounting assembly; and,
    extending the ferritic hub and at least one ferritic clamp out of the mounting assembly through the turntable central opening such that at least one ferritic clamp makes contact with the optical disc and secures the optical disc to the turntable.

12. The method as recited in claim 11, wherein the ferritic hub and at least one ferritic clamp are extended out of the mounting assembly using a force provided by a hub spring.

13. The method as recited in claim 11, wherein the ferritic hub and at least one ferritic clamp are extended out of the mounting assembly using a force provided by a hub spring.

14. The method as recited in claim 11, wherein at least one ferritic clamp is extended out of the mounting assembly through a pivot motion about a pivot axes.

15. The method as recited in claim 13, wherein the pivot motion is created by coupling at least one ferritic clamp to the ferritic hub in a cam configuration such that the pivot motion is generated in response to the displacement of the ferritic hub.

16. The method as recited in claim 11, wherein extending the ferritic hub and at least one ferritic clamp further includes extending the ferritic hub and at least one ferritic clamp completely through the central opening of an optical disc.

17. A method of mounting an optical disc to the turntable of an optical disc drive comprising the steps of:
    receiving an inserted optical disc;
    detecting the presence of an inserted optical disc;
    generating a disc input signal in response to the presence of an inserted optical disc;
    generating a magnetic field within the mounting assembly in response to the disc input signal, causing a ferritic hub and at least one ferritic clamp to retract into the mounting assembly;
    positioning the optical disc such that the optical disc is substantially centered about the turntable central opening;
    detecting the presence of the optical disc upon being substantially centered on the turntable central opening;
    generating a disc centered signal in response to the optical disc being substantially centered on the turntable central opening;
    collapsing the magnetic field in response to the disc centered signal, thereby eliminating the induced magnetic forces applied to the hub and at least one ferritic clamp; and
    generating an extending force that causes the hub and at least one of the clamps to extend out of the mounting assembly such that the clamp makes contact with the optical disc thereby mounting the optical disc to the turntable.

18. The method as recited in claim 16, wherein the presence of an inserted optical disc is detected using a sensor.

19. The method as recited in claim 16, wherein the presence of the optical disc being substantially centered about the turntable central opening is detected using a sensor.

20. The method as recited in claim 16, further comprising the steps of:
generating a disc detach signal; and,
generating a second magnetic field event within the mounting assembly in response to the disc detach signal, causing the ferritic hub and at least one ferritic clamp that is in contact with the optical disc to retract into the mounting assembly, thereby detaching the secured optical disc from the turntable.

21. The method as recited in claim 18, wherein the disc detach signal is generated through the associated computer of the optical disc drive.

22. A non-transitory computer readable medium for storing a computer program, the computer program executed by a processor for controlling the operation of an optical disc drive comprising:

computer code for detecting the presence of an inserted optical disc;
computer code for generating a disc input signal in response to the presence of an inserted optical disc;
computer code for sending the disc input signal to the electromagnet within the mounting assembly;
computer code for detecting the presence of the inserted optical disc being substantially centered about the turntable central opening;
computer code for generating a disc centered signal in response to the presence of the disc being substantially centered about the turntable central opening; and,
computer code for sending the disc centered signal to the electromagnet within the mounting assembly.

23. The non-transitory computer readable medium as recited in claim 21, wherein the computer program is stored and executed as the firmware of the optical disc drive.

24. The non-transitory computer readable medium as recited in claim 21, further comprising:
computer code for generating a disc detach signal; and,
computer code for sending the disc detach signal to the electromagnet within the mounting assembly.

* * * * *

UNITED STATES PATENT AND TRADEMARK OFFICE
CERTIFICATE OF CORRECTION

PATENT NO.       : 8,132,197 B2
APPLICATION NO.  : 12/841910
DATED            : March 6, 2012
INVENTOR(S)      : Paul J. Wehrenberg et al.

Page 1 of 1

It is certified that error appears in the above-identified patent and that said Letters Patent is hereby corrected as shown below:

In the Claims:

Column 7, line 67 (Claim 6, line 5): "turntable center" should read --turntable central--.

Column 8, line 35 (Claim 15, line 1): "claim 13," should read --claim 14,--.

Column 8, line 43 (Claim 16, line 4): "the central" should read --the turntable central--.

Column 9, line 17 (Claim 21, line 1): "the disc" should read --a disc--.

Column 9, line 18 (Claim 21, line 2): "the associated" should read --an associated--.

Column 10, line 16 (Claim 23, line 2): "claim 21," should read --claim 22,--.

Column 10, line 19 (Claim 24, line 2): "claim 21," should read --claim 22,--.

Signed and Sealed this
Fourth Day of November, 2014

Michelle K. Lee
*Deputy Director of the United States Patent and Trademark Office*